(12) United States Patent
Ott et al.

(10) Patent No.: US 8,141,769 B2
(45) Date of Patent: Mar. 27, 2012

(54) PROCESS FOR REPAIRING A COMPONENT COMPRISING A DIRECTIONAL MICROSTRUCTURE BY SETTING A TEMPERATURE GRADIENT DURING THE LASER HEAT ACTION, AND A COMPONENT PRODUCED BY SUCH A PROCESS

(75) Inventors: Michael Ott, Mülheim an der Ruhr (DE); Uwe Paul, Ratingen (DE); Robert Singer, Erlangen (DE); Andreas Volek, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 523 days.

(21) Appl. No.: 11/989,214

(22) PCT Filed: Jul. 22, 2005

(86) PCT No.: PCT/EP2005/008038
§ 371 (c)(1),
(2), (4) Date: Aug. 21, 2009

(87) PCT Pub. No.: WO2007/012338
PCT Pub. Date: Feb. 1, 2007

(65) Prior Publication Data
US 2010/0000976 A1 Jan. 7, 2010

(51) Int. Cl.
*B23K 26/34* (2006.01)
*B23K 31/02* (2006.01)
(52) U.S. Cl. .................. 228/119; 219/121.17
(58) Field of Classification Search ........... 219/121.63–121.66, 121.13, 121.14, 219/121.35; 228/119, 193, 194, 234.1, 245, 228/250, 46; 416/231 R, 241 R
See application file for complete search history.

(56) References Cited

U.S. PATENT DOCUMENTS

| | | | |
|---|---|---|---|
| 4,222,794 A * | 9/1980 | Schweizer et al. | 148/555 |
| 4,448,618 A * | 5/1984 | Bose et al. | 148/403 |
| 4,705,203 A | 11/1987 | McComas | |
| 4,830,934 A | 5/1989 | Ferrigno et al. | |
| 4,878,953 A | 11/1989 | Saltzman et al. | |
| 4,900,394 A | 2/1990 | Mankins | |
| 4,987,736 A | 1/1991 | Clokajlo et al. | |
| 5,165,463 A * | 11/1992 | Aghajanian et al. | 164/97 |
| 5,206,213 A * | 4/1993 | Cuomo et al. | 505/410 |
| 5,240,491 A * | 8/1993 | Budinger et al. | 75/255 |
| 5,523,170 A | 6/1996 | Budinger et al. | |
| 5,664,616 A * | 9/1997 | Gegel | 164/97 |
| 5,666,643 A | 9/1997 | Chesnes et al. | |
| 5,783,318 A | 7/1998 | Biondo et al. | |
| 5,806,751 A | 9/1998 | Arnold | |
| 5,873,703 A | 2/1999 | Kelly et al. | |
| 6,024,792 A | 2/2000 | Kurz et al. | |
| 6,050,477 A | 4/2000 | Baumann | |

(Continued)

FOREIGN PATENT DOCUMENTS

CN 2296989 A 10/1998

(Continued)

*Primary Examiner* — Samuel M Heinrich

(57) ABSTRACT

In one aspect, a repair method for repairing components comprising a base material with a directed microstructure is provided. The repair is performed in such a way that the repaired location correspondingly has a directed microstructure like the surrounding base material. A solder is applied in the region of a location to be repaired and is soldered to the component via heat exposure, a temperature gradient, i.e., for instance a temperature variation from a higher temperature to a lower temperature, is thereby produced in the region of the location to be repaired.

20 Claims, 5 Drawing Sheets

U.S. PATENT DOCUMENTS

| | | |
|---|---|---|
| 6,283,356 B1 | 9/2001 | Messlling |
| 6,331,361 B1 * | 12/2001 | Esch et al. .................. 428/548 |
| 6,454,885 B1 | 9/2002 | Chesnes et al. |
| 6,495,793 B2 | 12/2002 | Tewari |
| 6,503,349 B2 | 1/2003 | Pietruska et al. |
| 6,565,678 B2 | 5/2003 | Fairchild et al. |
| 7,416,108 B2 * | 8/2008 | Philip .................. 228/248.1 |
| 2003/0066177 A1 | 4/2003 | Schnell et al. |
| 2003/0075587 A1 | 4/2003 | Smashey et al. |
| 2004/0050913 A1 | 3/2004 | Philip |

FOREIGN PATENT DOCUMENTS

| | | |
|---|---|---|
| CN | 1339996 A | 3/2002 |
| EP | 0 412 397 | 2/1991 |
| EP | 0 486 489 | 11/1994 |
| EP | 0 631 832 | 1/1995 |
| EP | 0 892 090 | 1/1999 |
| EP | 0 786 017 | 3/1999 |
| EP | 1258545 A1 | 11/2002 |
| EP | 1 306 454 | 5/2003 |
| EP | 1 319 729 | 6/2003 |
| EP | 1 340 567 | 9/2003 |
| EP | 1 204 776 | 6/2004 |
| EP | 1 437 426 | 7/2004 |
| JP | 61095769 A | 5/1986 |
| JP | 6195769 A | 7/1994 |
| JP | 2001089258 A | 4/2001 |
| JP | 2004183652 A | 7/2004 |
| JP | 2005003003 A | 1/2005 |
| WO | WO 96/05006 | 2/1996 |
| WO | WO 98/05450 | 2/1998 |
| WO | WO 98/20995 | 5/1998 |
| WO | WO 99/67435 | 12/1999 |
| WO | WO 00/44949 | 8/2000 |
| WO | WO 03/087439 | 10/2003 |

* cited by examiner

PROCESS FOR REPAIRING A COMPONENT COMPRISING A DIRECTIONAL MICROSTRUCTURE BY SETTING A TEMPERATURE GRADIENT DURING THE LASER HEAT ACTION, AND A COMPONENT PRODUCED BY SUCH A PROCESS

CROSS REFERENCE TO RELATED APPLICATIONS

This application is the US National Stage of International Application No. PCT/EP2005/008038, filed Jul. 22, 2005 and claims the benefit thereof. The International Application is incorporated by reference herein in its entirety.

FIELD OF INVENTION

The present invention relates to a process for repairing a component which comprises a base material with a directional microstructure and to a component according to the independent claims.

BACKGROUND OF INVENTION

Nowadays, turbine components are often made from materials with a directional microstructure. In this context, materials with a directional microstructure are to be understood as meaning in particular single-crystal materials and materials which have a grain structure wherein the grains extend in a common preferential direction. By way of example, the grains may have a larger dimension in a certain preferential direction than in the other directions. Components with a grain structure of this type are also known as directionally solidified components.

Highly stressed components, such as for example turbine blades or vanes, are subject to high thermal and mechanical stresses in operation, which can lead to material fatigue and as a result to cracks. Since it is relatively expensive to produce components from base materials which have a directional microstructure, the general aim is for components of this type to be repaired after damage has occurred. This restores the functionality and allows the component to be used for a further maintenance period.

SUMMARY OF INVENTION

One way of repairing damaged components is soldering. During this soldering, a solder is applied to the material of the component, i.e. to the base material, in the region of the damage and is joined to the base material by means of the action of heat. However, after the soldering, in the procedure which has been customary hitherto, the solder material does not have a single-crystal or directionally solidified structure. However, an unordered structure brings with it materials properties that are worse than those of a directional microstructure, in particular in the high-temperature range, with the result that the soldered location then has materials properties that are worse than those of the surrounding base material.

Welding processes which can also be used to produce directional microstructures in the welded structures are also available for repairing damaged components with a directional microstructure. A process of this type is disclosed for example in EP 089 090 A1.

Further processes and solder powders to be used are known from publications U.S. Pat. No. 6,283,356, U.S. Pat. No. 4,705,203, U.S. Pat. No. 4,900,394, U.S. Pat. No. 6,565,678, U.S. Pat. No. 4,830,934, U.S. Pat. No. 4,878,953, U.S. Pat. No. 5,666,643, U.S. Pat. No. 6,454,885, U.S. Pat. No. 6,503,349, U.S. Pat. No. 5,523,170, U.S. Pat. No. 4,878,953, U.S. Pat. No. 4,987,736, U.S. Pat. No. 5,806,751, U.S. Pat. No. 5,783,318, U.S. Pat. No. 5,873,703.

U.S. Pat. No. 6,050,477 discloses a process for joining two component elements, wherein the solder is applied over a large area between the two component parts and a temperature gradient is used in order to generate the same directional microstructure. The entire component is heated.

US 2003/0075587 A1 discloses a repair process of a component with a directionally solidified microstructure, wherein, however, the repaired location does not have the same microstructure as the component that is to be repaired.

U.S. Pat. No. 6,495,793 discloses a welding repair process for nickel-base superalloys, which uses a laser that melts the material supplied via a material conveyor. Moreover, the base material is melted during the welding process.

No mention is made of the microstructure of the component or the repair location.

EP 1 285 545 A1 discloses a soldering process without temperature gradients.

EP 1 340 567 A1 discloses a welding process in which additional material is added to the location that is to be repaired and has already been melted. In this case too, the base material is melted. A temperature gradient is likewise used in order to treat the components with a directional microstructure.

U.S. Pat. No. 4,878,953 discloses a welding process for repairing a component with a directional microstructure, wherein material is applied to the location that is to be repaired by means of powder and this location has a fine-grained microstructure. Here too, the base material is melted.

However, welding processes always melt the base material of the component that is to be repaired. Consequently, structurally bearing regions of a component must not be welded, since melting of the base material destroys the integrity of the directional structure. Consequently, components with a directional microstructure are only repaired by means of the welding processes if the damage is not located in structurally bearing regions of the component. By contrast, if damage occurs in a structurally bearing region of the component, should a directional welded structure be required, this component is declared unrepairable and is replaced with an intact component.

Therefore, it is an object of the invention to provide a process and a component which can be used to repair damaged components comprising a base material with a directional microstructure even if the damage is located in a structurally bearing region of the component.

The object is achieved by the process and the component as claimed the independent claims. The dependent claims give advantageous configurations of the present invention which can be combined with one another in advantageous ways.

In a process according to the invention for repairing a component which comprises a base material with a directional microstructure, the repair is carried out in such a manner that the repaired location has a directional microstructure corresponding to that of the surrounding base material. The base material may in particular be a nickel-based material. In the process according to the invention, a solder is applied in the region of a location that is to be repaired and is soldered to the component by means of the action of heat. During the action of heat, a temperature gradient, i.e. a temperature profile from a higher temperature to a lower temperature, is generated in the region of the location that is to be repaired.

In the soldering process, only the solder but not the base material is melted and allowed to solidify again, with the solder forming a join with the base material, so that the repair process according to the invention can be used even in structurally bearing regions of the component without adversely affecting the good materials properties of the base material. Epitaxial growth and solidification of the solder, i.e. growth in which the crystalline orientation of the solder during solidification is determined by that of the substrate, i.e. the base material, can be achieved by means of the temperature gradient. Therefore, the temperature gradient allows the formation of a single-crystal solder region or another directional microstructure in the soldered solder with materials properties that are similarly improved compared to an undirectional microstructure. The directional growth takes place in the direction of the temperature gradient, i.e. in the direction from the lower temperature to the higher temperature. On account of the directional growth and the resulting directional microstructure, the soldered solder had similarly good materials properties to the base material of the component.

It is preferable for the temperature gradient in the repair process according to the invention to be generated in such a manner that it extends in the direction of orientation of the directional microstructure of the base material of the component. It is in this way possible to achieve a directional growth of the solidifying solder in the direction of orientation of the directional microstructure of the base material.

In an advantageous refinement of the process according to the invention, the solder includes a first constituent with a melting temperature, which is lower, preferably significantly lower, than the melting temperature of the base material of the component and a second constituent with a high strength and a melting temperature that is above the melting temperature of the first constituent but below the melting temperature up to the melting temperature of the base material. In this refinement of the process, the solder is applied in such a manner in the region of the location that is to be soldered that the proportion of the first constituent in the solder is higher in the local vicinity of the base material than in a region further away from the base material. In this configuration of the process, the first constituent with the low melting temperature serves to produce the join between the solder and the base material, while the constituent with the high melting temperature is responsible for the durability (strength) of the soldered solder. As a result of the solder having a higher proportion of the first constituent in the region of the base material, it is possible to produce a good join between the soldered solder and the base material. On the other hand, in regions which are further away from the base material, in relative terms more second constituent, i.e. more of the constituent with the higher durability, is present, with the result that those regions of the soldered location that, during subsequent operation of the component, are subject to higher stresses have a higher durability.

In the process according to the invention, all heating operations which are able to produce a temperature gradient in the region of a location that is to be soldered, i.e. in the solder, can be used to provide the action of heat. By way of example, it is possible to employ optical heating operations, for example by means of laser or conventional illumination devices, or inductive heating operations, for example by means of heating coils. Alternatively, it is also possible to use a casting furnace for casting materials with a directionally directed microstructure.

By way of example, what is known as a hot box can be used for the inductive heating. A hot box is substantially to be understood as meaning a device with a holder for holding the component that is to be repaired and an induction coil, arranged movably in the holder, for locally heating the component. The holder can be flooded with an inert gas, for example argon, during the soldering process.

In a refinement of the process according to the invention, a heat treatment of the base material can be integrated into the process of soldering the solder. In this way, refurbishment (rejuvenation) of the base material properties can be realized at the same time as the repair.

BRIEF DESCRIPTION OF THE DRAWINGS

Further features, properties and advantages of the present invention will emerge from the following description of an exemplary embodiment with reference to the accompanying drawings, in which.

DETAILED DESCRIPTION OF INVENTION

Figure 1A:
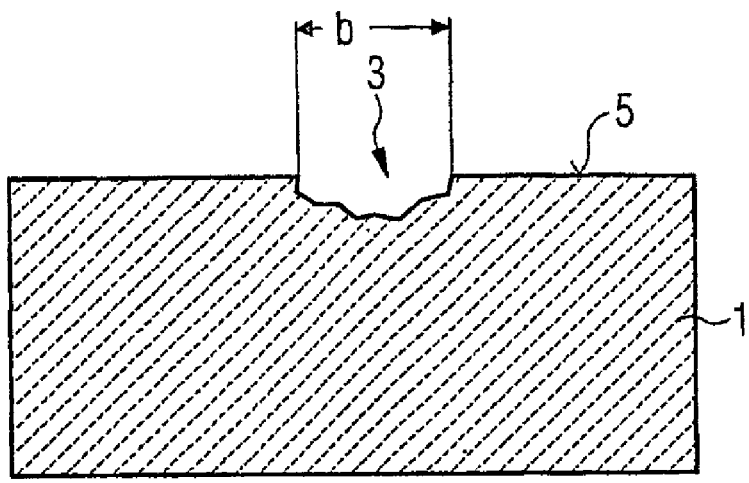
FIGS. 1a-1c show an exemplary embodiment of the process according to the invention.

FIG. 1a provides a schematic view of a damaged component 1.

The base material of the component 1 comprises an alloy, preferably based on nickel, and has a directional microstructure, which in the figures is indicated by short diagonal dashes. The damage 3 to the component 1 is located in the region of the surface 5 and is illustrated as an indentation in the figure.

Figure 1B:
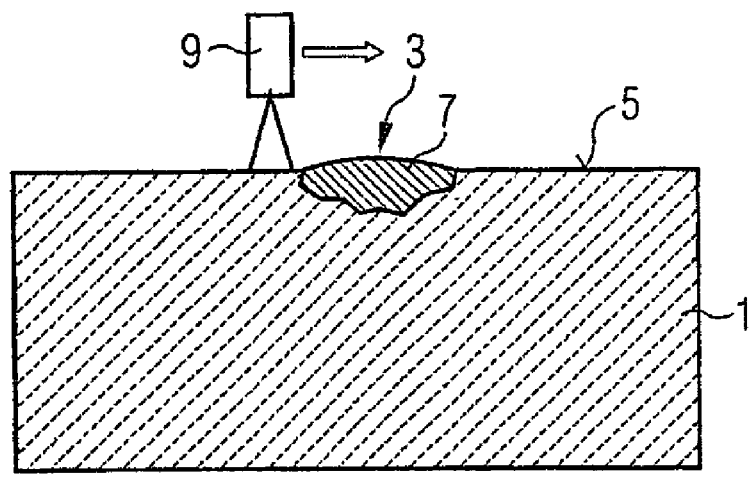

To repair the damaged component 1, a solder 7, which in the present exemplary embodiment is preferably in powder form, is applied to the precleaned, damaged location 3 and is then soldered to the base material of the component 1 by means of the action of heat (FIG. 1b). It is preferable for all of the solder 7 required to be introduced into the preferably precleaned, damaged location 3, if appropriate in a small excess, and in particular for it not to be supplied in steps during the fusing operation.

Prior to fusing, it is preferable for the solder 7 to be pressed into the damaged location 3. This has the advantage that the entire damaged location 3 is filled with the solder 7.

In particular in the case of very deep cracks 3 (high aspect ratio) with a nonuniform cross-sectional area, according to the prior art an external supply of powder using a powder feeder would not ensure that the solder 7 would reach the tip of the crack.

The solder 7 can be applied in the form of a paste, a slurry, in pure powder form or by means of a foil and then introduced into the damaged location 3. Further forms of introduction or application are also conceivable.

It is in this context advantageous if the material composition of the solder 7 is similar to that of the component 1. "Similar" means that the material of the solder 7 includes all the elements of the base material plus, in addition, one or more agents that lower the melting point (e.g. boron, silicon).

However, the solder 7 must comprise at least one constituent with a melting temperature that is lower than the melting temperature of the base material of the component 1, so that the action of heat melts the solder 7 but not the base material of the component 1.

It is preferable for the solder 7 to consist of one constituent, i.e. the solder 7 consists of an alloy and not a powder mixture of two alloys.

The soldering temperature of the solder 7 during soldering is at least 30° C. or at least 50° C. lower than the melting temperature of the base material of the component 1, so that there is no risk to the base material. It is preferable for the difference between the soldering temperature and the melting temperature to be between 50° C. and 70° C. This is important in particular if the base material is a superalloy. When using superalloys, chromium is vaporized at high temperatures close to its melting temperatures, and consequently the melting temperature of the solder 7 should be kept as low as possible so that the difference between soldering temperatures of the solder 7 and the melting temperature of the base material is as great as possible. The difference in the soldering temperature of solder 7 and the melting temperature of the base material is preferably also at least 70° C., preferably 70° C.±4° C. The maximum difference in the soldering temperature of the solder 7 and the melting temperature of the base material is preferably 120° C.

It is preferable for the solder 7 first of all to be melted in such a way that it runs into the location 3 that is to be repaired.

The temperature required to achieve this may be higher or lower than the temperatures used to set the directional microstructure.

There are no restrictions on the superalloy that is to be soldered. However, the materials PWA 1483, PWA 1484 and RENE N5 have proven particularly advantageous for use of the solder 7 according to the invention. PWA 1483 has a melting point of around 1341° C., RENE N5 has a melting point in the region around 1360° C.-1370° C.

The melting points of the solders 7 are, for example, between 1160° C.-1220° C.

When using high temperatures, a further problem is recrystallization in DS or SX materials, and consequently in this case too it is necessary for there to be a considerable difference between the soldering temperature of the solder 7 and the melting temperature of the base material of the component 1.

To realize the action of heat on the solder 7, in the present exemplary embodiment it is preferable for there to be an electron beam gun 9 which irradiates the solder 7 that is to be melted and thereby imparts to it the heat required for melting.

The electron beam treatment is preferably carried out in vacuo. In particular in the case of oxidation-sensitive materials, such as for example in the case of superalloys, oxidation plays an important role, and consequently a heat treatment should be carried out by means of a laser or an electron beam and in vacuo. The electron beam treatment has the advantage of leading to better introduction of energy into the material and the further advantage that the electron beams can be moved contactlessly over the location 3 that is to be repaired by coils, which in this case constitute the optics.

The action of heat on the solder 7 can also be implemented by means of laser beams.

The laser power or the power of the electron beams is such that it is able to completely melt the solder 7 and bring it to the soldering temperature. The soldering temperature of the solder 7 is in some cases up to 140° above the melting temperature of the solder 7.

The power of a Nd-YAG laser is preferably between 1500 and 2000 W.

According to the invention, during the soldering operation a temperature gradient is produced in the region of the damage 3 deliberately in a preferential direction of the microstructure of the base material. The temperature gradient can be produced by moving the component 1 and the electron beam gun 9 relative to one another. In the exemplary embodiment, therefore, the electron beam gun 9 is guided over the solder 7 parallel to the surface 5. The rate at which the electron beam gun 9 is guided over the solder 7 is selected in such a manner that the desired temperature gradient is established in the region of the damage 3, i.e. in the solder 7. The temperature gradient induces the formation of an epitaxially directional microstructure when the solder 7 that has been melted by the electron beam gun 9 solidifies again. The steepness of the temperature gradient can be set, for example, by the rate at which the electron beam gun 9 and component 1 are moved relative to one another or by means of the power. In this context, the steepness of the gradient is to be understood as meaning the increase or decrease in the temperature per unit length. The steepness of the temperature gradient, which leads to the formation of a directional microstructure in the solidifying solder 7, is dependent on the composition of the solder 7.

The temperature gradient that is to be set is given by the so-called GV diagram, which differs for different metals and metal alloys and needs to be calculated or experimentally determined for every alloy. A curve L in the GV diagram separates the range of the two parameters solidification rate and temperature gradient in which the alloy solidifies in globulitic form from that in which the alloy solidifies to form a dendritic directional microstructure. A description and explanation of the GV diagram is to be found, for example, in Material Science Engineering volume 65, 1984 in the publication by J. D. Hunt entitled "Columnar to equiangular transition".

The temperature gradient is determined from the soldering temperature of the solder 7 and the temperature of the component on the rear side of the location 3 that is to be repaired.

Preferably, the component 1 is not cooled or held at room temperature or if appropriate preheated up to 300°, as described in documents WO 98/20995, WO 98/05450, WO 96/05006 or EP 0 631 832 A1.

Processes for producing single-crystal structures by means of a laser or in an equivalent way by electron beams are also disclosed in EP 1 437 426 A1 or in WO 03/087439 A1, which are intended to form part of the present disclosure with regard to the use of laser or electron beams for generating single-crystal structures.

In the present exemplary embodiment, the preferential direction of the directional microstructure in the base material of the component 1 extends from left to right in the plane of the drawing. To induce the formation of a directional microstructure with a preferential direction corresponding to that of the base material in the solidifying solder 7, the electron beam gun 9 is moved relative to the component 1 parallel to the preferential direction of the directional microstructure of the base material.

If the component 1 has a SX structure, the repaired location 3 may likewise have a SX or alternatively a DS structure.

If the component 1 has a DS structure, the repaired location 3 may likewise have a DS or alternatively a SX structure.

It is preferable for component 1 and repaired location 3 to have the same microstructure.

Equally, the component 1 does not need to have a directionally solidified structure, in which case the directionally solidified structure in the repaired location 3 at high temperatures increases the strength of the component 1, since the directionally solidified structure of the solder 7 in the repaired location compensates for the negative effect of the low melting point on the mechanical strength at higher temperatures.

A width b (FIG. 1a) of the location that is to be repaired is between 1 μm and 1000 μm, preferably around 500 μm. The laser or electron beam may preferably cover the entire width b of the location 3 that is to be repaired. Since the component 1 is heated only in the region of the location 3 that is to be repaired, this constitutes a local repair process or local soldering process.

It is preferable for the width b of the location 3 that is to be repaired to be between 5 μm and 300 μm.

It is equally advantageous for the location 3 that is to be repaired to have a width b of between 5 μm and 1000 μm.

Furthermore, crack widths b of between 20 μm and 300 μm can be repaired.

The location 3 that is to be repaired preferably has widths b of between 20 μm and 100 μm.

It is equally preferable for the location 3 that is to be repaired to have a width of between 50 μm and 300 μm.

Further advantages are achieved if the location 3 that is to be repaired has a width b of between 50 μm and 200 μm.

Moreover, cracks 3 with a width of between 50 μm and 100 μm are also repaired in an advantageous way by the process.

There are no restrictions on the length of the location that can be repaired. In this context, however, the laser 9 and the electron beams may have to be moved in the longitudinal direction (into the plane of the drawing), in which case the laser is moved in this direction as described in WO 03/087439 A1. The rates at which the laser beams or electron beams are moved are preferably 100 mm/min to 130 mm/min.

The holding times of the laser or electron beam depend on the material and the weight of solidification.

Figure 1C:
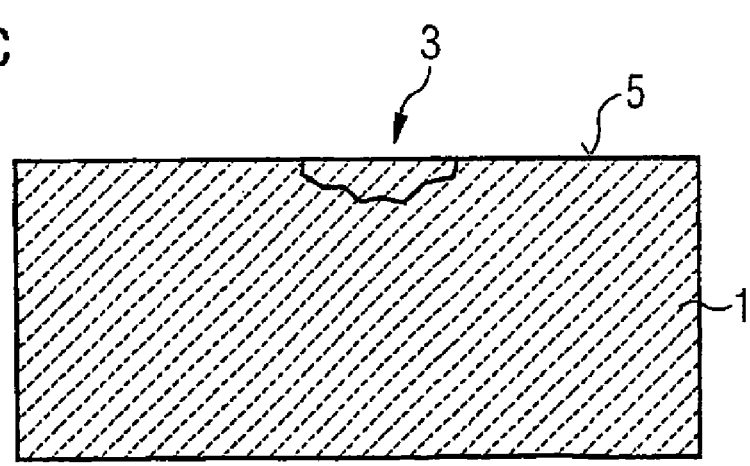

FIG. 1c shows the component 1 after the damage 3 has been repaired. As indicated by the diagonally running dashes in the region of the now solidified solder 7, the solidified solder 7, i.e. the repair material, has a directional microstructure with the same preferential direction as the directional microstructure of the base material of the component 1.

The electron beam can also be widened in such a way that, for example, it irradiates all of the solder 7 and at least thereby completely heats said solder.

It is not absolutely imperative that the electron beam gun be moved.

The dissipation of heat from the solder 7 into the substrate of the component 1 produces a temperature gradient within the solder 7. The temperature is highest at the outer surface of the solder 7 and cooler at the interface between the solder 7 and the substrate of the component 1. If appropriate, the component 1 can be cooled or heated on the rear side, opposite the damage 3 or elsewhere, in order to set a desired, specific temperature gradient as a function of the geometry of the component 1 and of the damage 3.

In the present exemplary embodiment, an electron beam gun 9 was used to supply the heat.

Alternatively, however, it is also possible to use other optical heating methods, for example illumination with a conventional illumination apparatus. Moreover, it is also possible to use inductive heating methods instead of optical heating methods, in which case the solder is heated by means of heating coils. Finally, it is also possible to use special heating furnaces such as for example a "hot box" or a casting furnace for producing a casting with a directionally directed microstructure. In any case, the process used must be suitable for producing a temperature gradient in the direction desired for solidification in the region of the damage or of the solder-filled damage. If a furnace is used, this can be effected, for example, by means of a stationary furnace which makes it possible to set the action of heat separately in different regions of the furnace.

Figure 2:
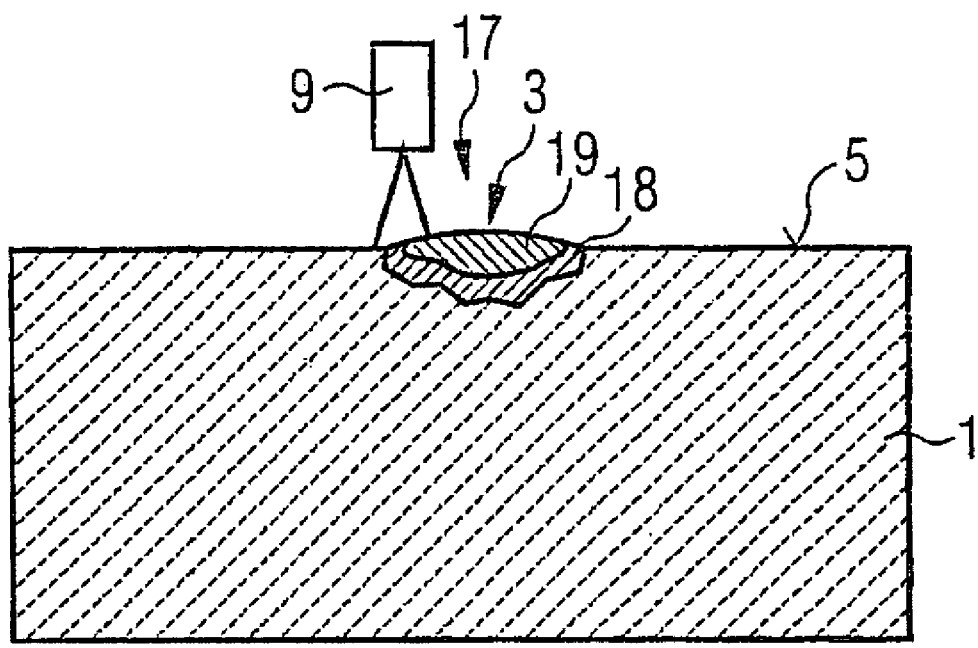
FIG. 2 shows a modification of the exemplary embodiment.

FIG. 2 illustrates a modification of the exemplary embodiment that has been illustrated with reference to FIGS. 1a to 1c. In the modification of the exemplary embodiment, the solder 17 applied to the damaged location 3 comprises two constituents, of which the first constituent has a melting temperature that is significantly lower than that of the base material of the component 1. By contrast, the second constituent has a melting temperature which is in the range between the melting temperature of the first constituent and the melting temperature of the base material. Moreover, the second constituent in particular also has a high strength, for example of the order of magnitude of the base material.

It is preferable for the solder 17 in powder form to be applied to the precleaned, damaged location 3 in such a manner that first of all a solder composition 18 in which the first constituent forms a relatively high proportion of the powder is applied. This is followed by application of a solder composition 19 in which the first constituent is present in a reduced proportion compared to the second constituent. If the solder 17 is then soldered to the base material, the high proportion of the first constituent, i.e. of the constituent with the low melting temperature, makes it easier to solder the solder to the base material, whereas the solder composition 19 in which the proportion of the first constituent is reduced ensures a higher strength of the repaired location.

It is also possible for the solder composition 18 to ensure a higher strength of the location 3 that is to be repaired and for the solder composition 19 closer to the surface to have a higher resistance to oxidation and/or corrosion.

As an alternative to this two-layer structure of the solder 7, the solder 7 in the location 3 that is to be repaired may have a material gradient from the base of the location 3 to the surface 5 of the component in which the composition of the solder 7 changes continuously.

In both exemplary embodiments of the process according to the invention, it is also possible for the action of heat for soldering the solder 7, 17 to the base material of the component 1 to be used simultaneously to carry out a heat treatment on the base material, in order thereby to allow refurbishment (rejuvenation) of the base material properties.

In the exemplary embodiment described and its modification, the solder 7, 17 is applied in powder form to the location that is to be repaired. Alternatively, however, it can also be applied as a foil or a paste.

The powder of the solder 7, 17 is, for example, in the form of a nanopowder, i.e. the grain sizes of the powder are less than 500 or less than 300 or less than 100 nanometers. This is because it has been found that a nanopowder solder 7 has a lower melting temperature than a conventional powder of the same composition with micrometer-sized grains. The powder of the solder 7, 17 may also comprise a mixture of nanopowder and conventional powder, i.e. a powder with grain sizes in the micrometer range.

The reduction in melting point can be set in a targeted way as a result.

It is also possible for the foil or paste by means of which the solder 7 is applied to partially or completely include a nanopowder.

The advantage over the prior art is that in this case the powder is not supplied via a powder feeder, but rather is fed in ready-compacted form to the location 3 that is to be repaired. Supplying a nanopowder to a location 3 that is to be repaired via a nozzle, as is known from the prior art, is almost impossible, since the grains of the nanopowder are much too small and would be scattered very widely during spraying.

Figure 3:
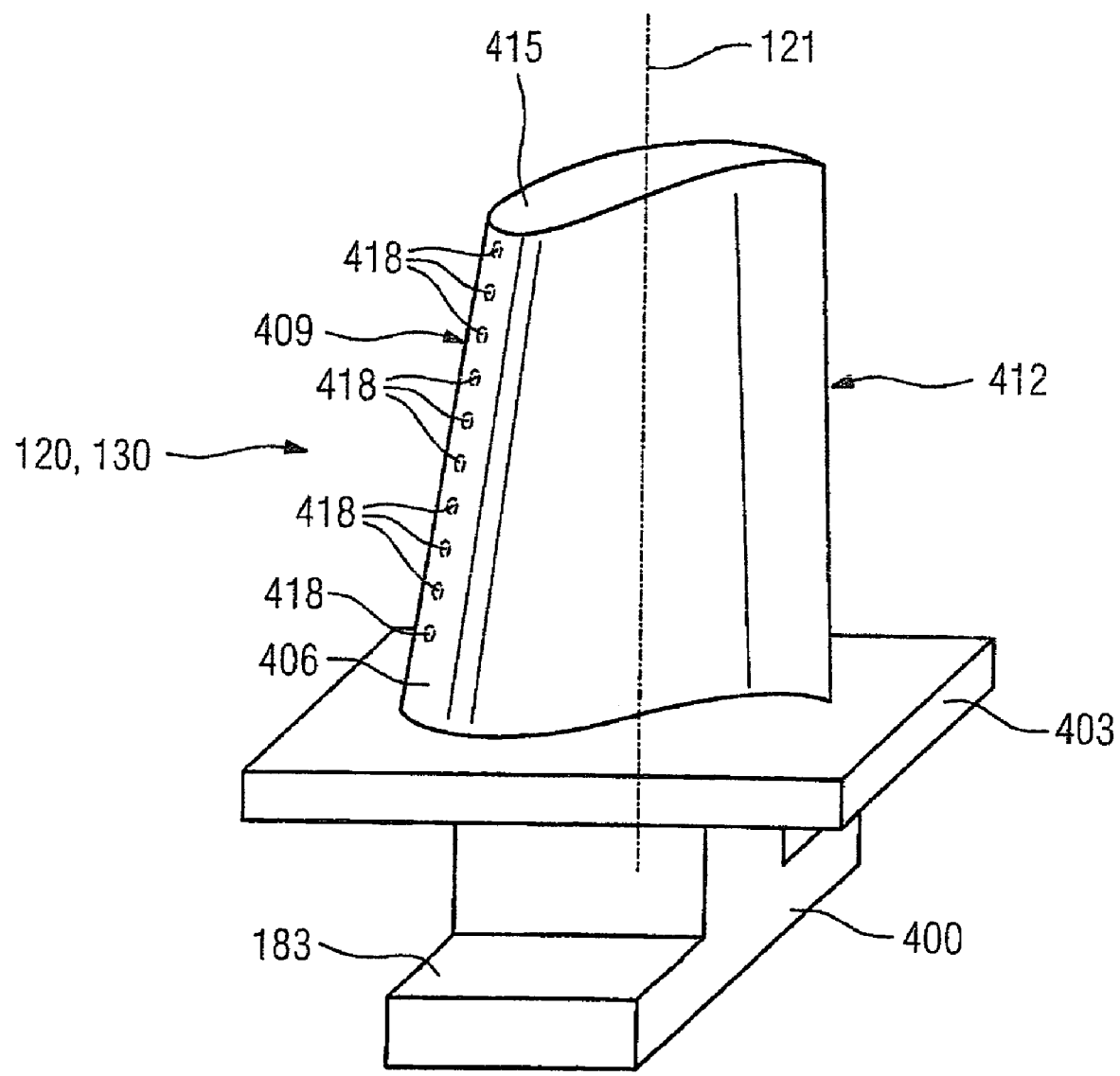
FIG. 3 shows a turbine blade or vane.

FIG. 3 shows a perspective view of a rotor blade 120 or guide vane 130 of a turbomachine 100, which extends along a longitudinal axis 121 and which is repaired with the inventive process.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 is in this case produced by a casting process by means of directional solidification.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure.

The blades or vanes 120, 130 may likewise have protective layers 8 according to the invention protecting against corrosion or oxidation e.g. (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a thermal barrier coating, consisting for example of $ZrO_2$, $Y_2O_4$—$ZrO_3$, i.e. unstabilized, partially stabilized or completely stabilized by yttrium oxide and/or calcium oxide and/or magnesium oxide, to be present on the MCrAlX.

Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 4:
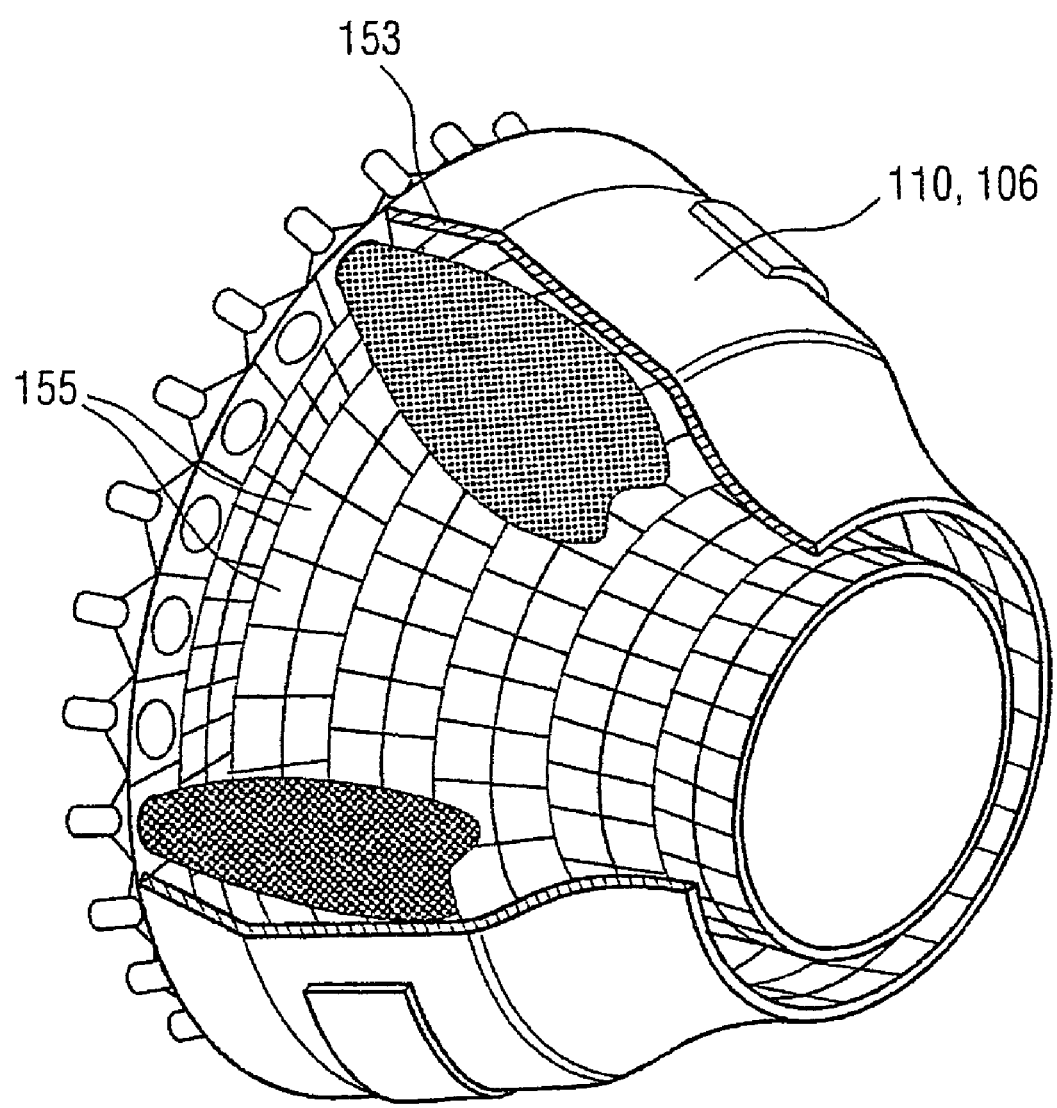
FIG. 4 shows a combustion chamber.

FIG. 4 shows a combustion chamber 110 of a gas turbine 100. The combustion chamber 110 is configured, for example, as what is known as an annular combustion chamber, in which a multiplicity of burners 107, which generate flames 156, arranged circumferentially around the axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth or hafnium (Hf). Alloys of this type are known for example from EP 0 486 489 B1, EP 0 786 017 B1, EP 0 412 397 B1 or EP 1 306 454 A1, which are intended to form part of the present disclosure with regard to the chemical composition of the alloy.

It is also possible for a, for example, ceramic thermal barrier coating to be present on the MCrAlX, consisting for example of $ZrO_2$, $Y_2O_4$—$ZrO_2$, i.e. unstabilized, partially stabilized or fully stabilized by yttrium oxide and/or calcium oxide and/or magnesium oxide.

Columnar grains are produced in the thermal barrier coating by means of suitable coating processes, such as for example electron beam physical vapor deposition (EB-PVD).

Refurbishment means that after they have been used, protective layers may have to be removed from heat shield elements 155 (e.g. by sand-blasting). Then, the corrosion and/or oxidation layers and products are removed. If appropriate, cracks in the heat shield element 155 are also repaired. It is followed by recoating of the heat shield element 155, after which the heat shield element 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have film-cooling holes (not shown) opening out into the combustion chamber space 154.

Figure 5:
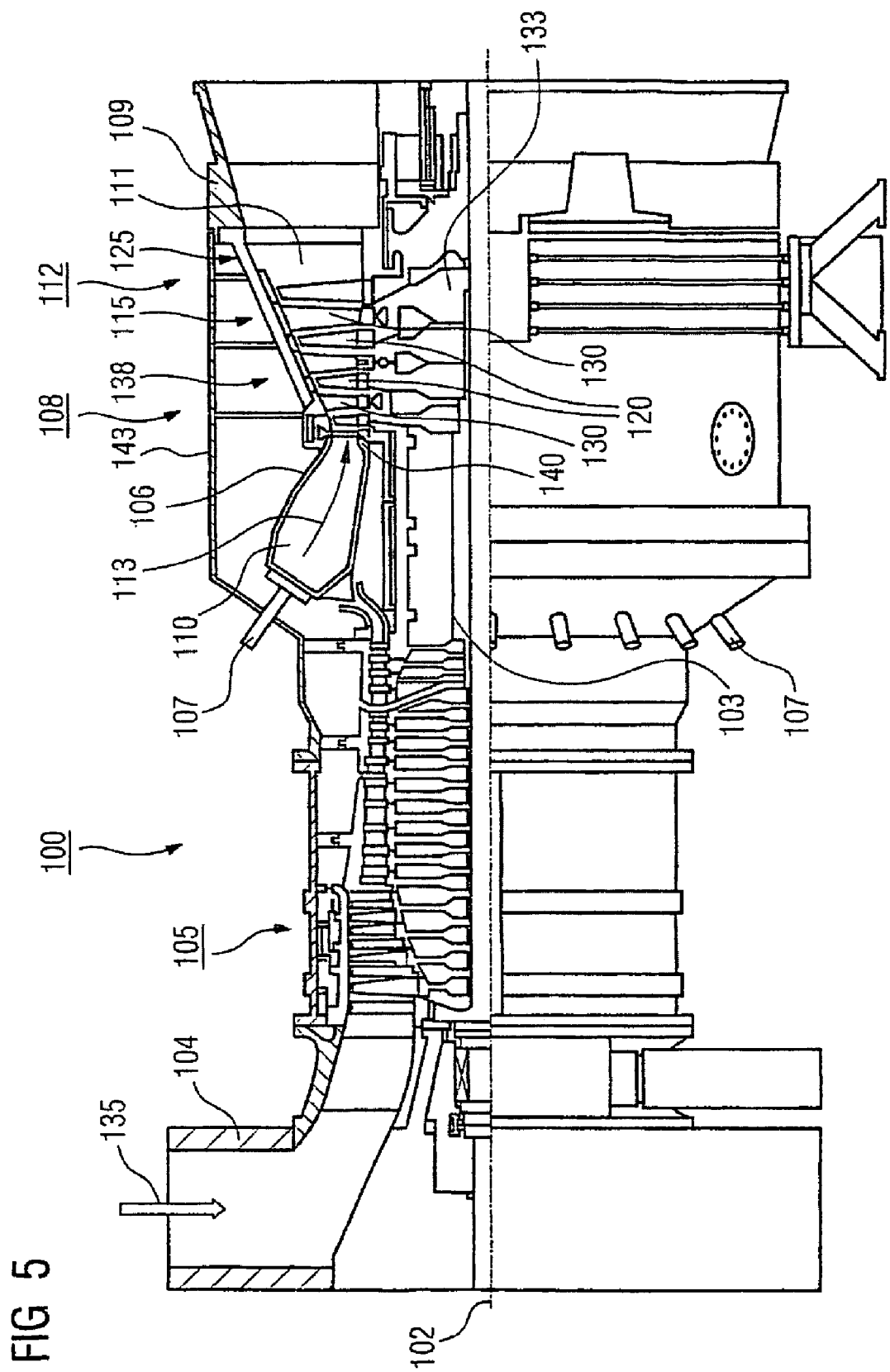
FIG. 5 shows a gas turbine.

FIG. 5 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they have to be cooled by means of a coolant. Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure with regard to the chemical composition of the alloys.

A thermal barrier coating, consisting for example of $ZrO_2$, $Y_2O_3$—$ZrO_2$, i.e. unstabilized, partially stabilized or completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A method for repairing a structural bearing region of a component having a base material with a directional microstructure, comprising:
    applying a solder in a region of a location to be repaired, the solder comprises at least one constituent; and
    applying heat at the region of the location to be repaired at a soldering temperature so that the solder is soldered to the component,
    wherein the soldering temperature of the solder is at least 30° C. lower than a melting temperature of the base material,
    wherein during applying heat, a temperature gradient in the region of the location to be repaired is set to generate a directional microstructure in the location to be repaired, and
    wherein the repaired location has the same directional microstructure as the surrounding base material and that the applying heat takes place locally in the region of the location to be repaired.

2. The method as claimed in claim 1, wherein the difference between the soldering temperature of the solder and the melting temperature of the base material of the component is at least 50° C.

3. The method as claimed in claim 1, wherein the difference between the soldering temperature of the solder and the melting temperature of the base material of the component is at least 70° C.

4. The method as claimed in claim 1, wherein the difference between the soldering temperature of the solder and the melting temperature of the base material is 70° C.±4° C.

5. The method as claimed in claim 1, wherein all the solder is completely applied prior to applying heat to completely melt the solder.

6. The method as claimed in claim 1, wherein the applying heat is effected by electron beams.

7. The method as claimed in claim 1, wherein the component comprises a nickel- or cobalt-base superalloy.

8. The method as claimed in claim 1, wherein the temperature gradient is oriented to extend in the direction of the orientation of the directional microstructure of the base material of the component.

9. The method as claimed in claim 1, wherein a first constituent of the solder has a melting temperature, which is lower than the melting temperature of the base material of the component,
    wherein the solder includes a second constituent with a high durability and a melting temperature which is above the melting temperature of the first constituent but below the melting temperature of the base material up to the melting temperature of the base material, and wherein the solder is applied in the region of the location to be soldered such that that the proportion of first constituent in the solder is higher in the vicinity of the base material than in a region further away from the base material.

10. The method as claimed in claim 1, wherein the temperature gradient is produced via a casting furnace capable of setting different temperatures for different regions of the component for locally applying heat to the region of the location of the repair and for producing a casting with a directionally directed microstructure.

11. The method as claimed in claim 1, wherein a heat treatment of the base material is integrated into the soldering of the solder.

12. The method as claimed in claim 1, wherein the solder consists of nano-powder.

13. The method as claimed in claim 1, wherein the solder is introduced onto or into the location to be repaired in the form of a paste, a slurry or a foil.

14. The method as claimed in claim 1, wherein the solder comprises just one constituent.

15. The method as claimed in claim 1, wherein the temperature gradient is determined by the soldering temperature of the solder and the temperature of the component, and wherein the temperature of the component is 300° C. or room temperature.

16. The method as claimed in claim 1, wherein the location (3) that is to be repaired has a width of between 1 μm and 1000 μm.

17. The method as claimed in claimed 16, wherein the location to be repaired has a width of between 1 μm and 500 μm.

18. The method as claimed in claimed 16, wherein the location to be repaired has a width of between 400 μm and 600 μm in particular around 500μ.

19. The method as claimed in claim 6, wherein a laser power or a power of the electron beams is such that it at least partially melts the solder.

20. The method as claimed in claim 19, wherein the speed of travel or holding times of the laser beams or electron beams is such that the solder solidifies in dendritic form in the region of the location to be repaired.

* * * * *